United States Patent
Collas et al.

(10) Patent No.: US 8,065,190 B2
(45) Date of Patent: Nov. 22, 2011

(54) PARTY PAYMENT SYSTEM

(75) Inventors: James Collas, San Diego, CA (US);
Chris Nicolaidis, Carlsbad, CA (US);
Jonathan Shultz, Jamul, CA (US);
Jeffery Hall, San Diego, CA (US)

(73) Assignee: BillMyParents, Inc., San Diego, CA (US)

( * ) Notice: Subject to any disclaimer, the term of this patent is extended or adjusted under 35 U.S.C. 154(b) by 0 days.

(21) Appl. No.: 12/609,885

(22) Filed: Oct. 30, 2009

(65) Prior Publication Data
US 2010/0114733 A1 May 6, 2010

Related U.S. Application Data

(60) Provisional application No. 61/109,803, filed on Oct. 30, 2008.

(51) Int. Cl.
*G06Q 30/00* (2006.01)
(52) U.S. Cl. ............ 705/26.1; 705/26.41; 705/26.81; 705/26.82; 705/27.1
(58) Field of Classification Search ............ 705/26, 705/27, 14
See application file for complete search history.

(56) References Cited

U.S. PATENT DOCUMENTS

| | | | |
|---|---|---|---|
| 5,953,710 A | 9/1999 | Fleming | |
| 6,343,279 B1 * | 1/2002 | Bissonette et al. | 705/41 |
| 2002/0123938 A1 * | 9/2002 | Yu et al. | 705/26 |
| 2003/0061111 A1 * | 3/2003 | Dutta et al. | 705/26 |
| 2004/0034568 A1 * | 2/2004 | Sone | 705/26 |
| 2005/0010483 A1 * | 1/2005 | Ling | 705/26 |
| 2005/0273405 A1 * | 12/2005 | Chen | 705/35 |
| 2006/0235789 A1 * | 10/2006 | Koch | 705/39 |
| 2007/0005514 A1 | 1/2007 | Fieschi et al. | |
| 2007/0150413 A1 * | 6/2007 | Morgenstern | 705/39 |

FOREIGN PATENT DOCUMENTS

| | | |
|---|---|---|
| KR | 10-2004-0079496 | 9/2004 |
| KR | 10-2007-0103654 | 10/2007 |

OTHER PUBLICATIONS

"Prepaid debit cards for kids play into parents' fiscal hopes, fears" (Vicki Lee Parker, Columbia Daily Tribune, Columbia, MO.: Feb. 19, 2007).*

International Search Report and Written Opinion as issued in International Patent Application No. PCT/US2009/062859 on Jun. 11, 2010, 6 pages.

* cited by examiner

*Primary Examiner* — Jeffrey A Smith
*Assistant Examiner* — Courtney Stopp
(74) *Attorney, Agent, or Firm* — Procopio Cory Hargreaves & Savitch LLP

(57) ABSTRACT

Systems and methods are disclosed herein which that enable a first party, such as a child, to selected one or more items offered by an online retailer and to send a request to a second party, such as a parent or guardian, to request that the second party purchase the item or items for the first party. The systems and methods provide the second party with the ability to view requests received from the first party, to set limits on the number of requests and the amounts of the requests that the first party may make. The second party may also designate the parties to whom the first party may submit purchase requests. The child may also submit request to one or more non-parental contributors who may contribute money toward the purchase the one or more items for the child.

17 Claims, 7 Drawing Sheets

Managing Pending Requests (Child)

FIG. 3
Child Requests Third Party Payment for Item(s)

FIG. 4  Processing Requests for Third Party Payment

FIG. 5

Payment Processing

FIG. 6
Managing Pending Requests (Child)

FIG. 7 Managing Pending Requests (Parent/Guardian)

FIG. 8

Managing Child
(Parent/Guardian)

PARTY PAYMENT SYSTEM

RELATED APPLICATION

This application claims the benefit of U.S. provisional patent application Ser. No. 61/109,803 entitled "RELATED PARTY PAYMENT SYSTEM," filed on Oct. 30, 2008, which is incorporated herein by reference in its entirety.

FIELD OF THE INVENTION

The present invention generally relates to the field of payment processing and relates to processing third party payments requests to purchase an item for a user from an online retailer.

BACKGROUND

Electronic commerce ("e-commerce"), the buying and selling of products and services over the Internet has flourished with the widespread availability of Internet access. Online retailers (also referred to herein as "e-tailers") may be a traditional brick and mortar retailers with a physical presence such as a store where customers can shop in person that also have an online store. Customers may purchase products or services from both the retailer's brick and mortar stores and the retailer's online store Other online retailers maintain an online presence only and customers purchase goods or services from the online retailer's online store.

Customers select products or services that they would like to purchase, and the products and services are "placed" in an electronic shopping cart or shopping basket. The electronic shopping cart allows users to accumulate a list of products or services for purchase while browsing an online shop. A typical electronic shopping card also enables the customer to initiate an electronic payment transaction to pay for the selected goods or services. Online purchases are typically funded through various types of electronic financial transactions, such as through credit card or debit card transactions.

Many online retailers offer products and services that appeal to children, but children do usually do not have a credit or debit card with which to purchase these items. Instead, a child typically must ask a parent or guardian or a close relative, such as a grandparent, to go online and purchase a desired item for the child. Conventional online payment systems do not provide a mechanism for a child to request that parent or other related party pay for desired item for the child.

SUMMARY

Systems and methods are disclosed herein that enable a first party, such as a child, to select one or more items offered by an online retailer and to send a request to a second party, such as a parent or guardian, to request that the second party purchase the item or items for the first party. The systems and methods provide the second party with the ability to view requests received from the first party, to set limits on the number of requests and the amounts of the requests that the first party may make. The second party may also designate the parties to whom the first party may submit purchase requests. The child may also submit request to one or more non-parental contributors who may contribute money toward the purchase of one or more items for the child.

According to an embodiment, a computer-implemented method for processing third party payment requests is provided where one or more computers are programmed to perform specified steps. The steps include receiving a third party payment request from a user to request that a third party payor fund the purchase of an item from an online retailer for the user, and sending a payment authorization request to a third party payor designated in the third party payment request. The steps also include receiving a response to the payment authorization request from the third party payor, and processing the third party payment request to purchase the item from the online retailer if the response is an authorization to pay for the item for the user.

In another embodiment, a computer-readable storage medium having stored thereon one or more sequences of instructions for causing one or more microprocessors to perform the steps for processing third party payments is provided. The steps include receiving a third party payment request from a user to request that a third party payor fund the purchase of an item from an online retailer for the user, and sending a payment authorization request to a third party payor designated in the third party payment request. The steps also include receiving a response to the payment authorization request from the third party payor, and processing the third party payment request to purchase the item from the online retailer if the response is an authorization to pay for the item for the user.

In yet another embodiment, a system for processing third party payments is provided. The system includes a processor connected to a computer readable storage device for executing programmed modules stored therein. The system also includes a request processing module and a payment processing module. The request processing module is configured to receive third party payment requests from a user requesting that a third party fund the purchase of an item, send a payment authorization request to the third party payor, and receive an authorization response from the third party payor. The payment processing module is configured to process the third party payment request to purchase the item from the online retailer if the authorization response indicates that the third party payor would like to pay for the item for the user.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Systems and methods are disclosed herein for processing third party payment requests where a user requests that a third party, such as a parent, pay for all or part of an item or item(s) offered for sale by an online shop. The user may designate more than one payor in the third party payment request. The designated payors may be a parent or guardian or may be other contributors authorized by the parent or guardian. One or more of the designated payors can authorize a payment of all or part of the requested amount or the payors may decline the payment. If a payor or combination of payors provides the full amount requested in the third party payment request, payments are drawn from funding sources associated with each of the payors that authorized the payment. The user account is also associated with a supervisory account (also referred to herein as a parent account) that is associated with a person who has the authority to set limits on the number of requests that a user can make, the amount that a user may request, and/or set other limits on the user's ability to request third party payments to pay for items from an online retailer.

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention.

Throughout this description the term "child" is used to designate person for whom a payment in made to a payee in exchange for a product or service offered for sale by the payee. The terms "parent" and "guardian" are used to refer to a supervisory payor in the related party payment system that can make payments to payees on behalf of a "child" entity, can monitor the transaction histories of "child" entities, can authorize or decline these transactions, and impose limits on request for third party payments that can be made by the a child. However, the systems and methods described herein are not merely limited to a parent-child relationship and may be applied to other types of relationships where a supervisory entity monitors and/or makes third party payments on behalf of another entity.

Figure 1:
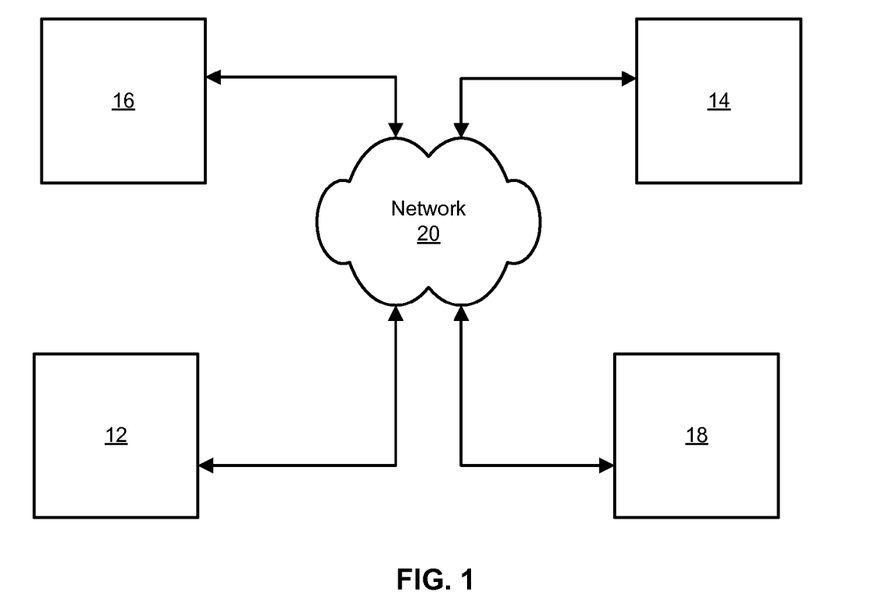
FIG. 1 is a block diagram of an environment in which a related party payment system can be implemented according to an embodiment.

In one embodiment, the systems and methods described herein can be implemented in the environment illustrated in FIG. 1. The environment includes user devices 12 and 18, an electric retailer server 14, and a related party payment server 16, and network 20. Electronic retailer server 14 is a network-connected server computer system that is used to implement an online shop for an online retailer from which users can purchase products and/or services from an electronic catalog of products and/or services. In some embodiments, electronic retailer server 14 may be a collection of servers used to implement an online shop, such as web server for implementing a web page interface for the online shop and a database server for storing product and/or service information and transactional information.

The electronic retailer server 14 can provide an online shop that includes a shopping cart or other payment-related interface that allows a child to select one or more items for purchase from the online shop and to indicate that the child would like to pay for the selected item or items using a third party payment where someone else pays for the item or items for the child. The online retailer server 14 can then send a third party payment request to the related party payment server 16 for processing. The online shop can suspend the child's shopping cart while the third party payment request is processed and complete the transaction if the third party payment request is authorized by a payor. According to an alternative embodiment, the electronic retailer may integrate a button or other navigational element, such as a link, directly on a product web page within the online shop. Instead of adding the item to the online shop's shopping cart, the child can click the button or activate navigational element to generate a third party payment request. The button may redirect the child to a payment request information screen where the child can select the payors (e.g. a parent and/or one or more contributors) who will receive the third party payment request.

Related party payment server 16 is a network-connected server computer system or set of computer systems that can be used to implement the various related party payment processing techniques described herein. The related party payment server 16 is configured to process payment requests from a child, to present payment request to a parent or other payor (referred to herein as "contributors"), and to execute payment processing on approved payment authorization requests. Related party payment server 16 may communicate with payment processing networks, banks, and/or other financial entities (not shown) for processing payment transactions.

The related party payment server 16 provides for three types of accounts: child, parent, and contributor. Child accounts can be used to make third party payment requests to a parent and/or one or more contributors. A child account also enables a child to view pending third party payment requests and modify or cancel the pending requests. A parent account is a supervisory account that is able to manage one or more child accounts, approve or decline payment requests submitted to the parent by the child, and set various limits on what each child can do. For example, the parent account can limit the number of third party payment requests that a child can create over a specified period of time, and can also set monetary limits on those requests as well. The parent account may also have one or more funding source associated with the parent account for paying authorized payment requests. Parent accounts can also view the transaction histories associated with each of the child account associated with the parent account. The parent account also enables the parent to impose limitations on which contributors may designate as payors. Contributor accounts enable third parties, such as grandparents, to receive third party payment requests from a child, view pending requests sent to the contributor account, authorize or decline the pending requests, and to set up funding sources from which authorized third party payment payments can be withdrawn. The parent and/or contributor accounts may also be used to view messages send to the parent or contributor by the child. Related party payment server 16 provides a user interface, such as a web page or set of web pages, for children, parents, and contributors to log into their accounts and performing the various functions outlined above.

Related party payment server 16 is also configured to communicate with electronic retailer server 14 to receive product information, payment request information from the electronic retailer server 14 and to provide payment transaction information to the electronic retailer, including payment processing details for approved payments, and notifications whether a pending transactions has been approved or denied by a payor. In an embodiment, the related party payment server 16 is implemented by the electronic retailer and can be implemented on the electronic retailer server 14. In other embodiments, the related party payment server 16 is implemented as a separate server or set of servers from the electronic retailer server 14.

User devices 12 and 18 are computing devices. Each user device comprises a processor, a network interface card, and memory. User devices 12 and 18 may be implemented as various types of computer systems, such as laptop computers, handheld computers, mobile phones, and/or other devices that have processors and browser software capable of accessing and displaying web pages from the Internet. The network interface card of the user device provides a wired or wireless connection to network 20. Network 20 is a public network or set of interconnected networks, such as the Internet. User devices 12 and 18 can communicate with the electronic retailer server 14 and the related party payment server 18 via network 20. In an embodiment, user devices 12 and/or 18 may be connected to network 20 via one or more intermediate networks, such as a local area network (LAN), wide area network (WAN), personal area network (PAN), or wireless network. User devices 12 and 18 include browser software that enables to the user to access the respective web pages of the related party payment server 16 and the electronic retailer server 14.

Figure 2:
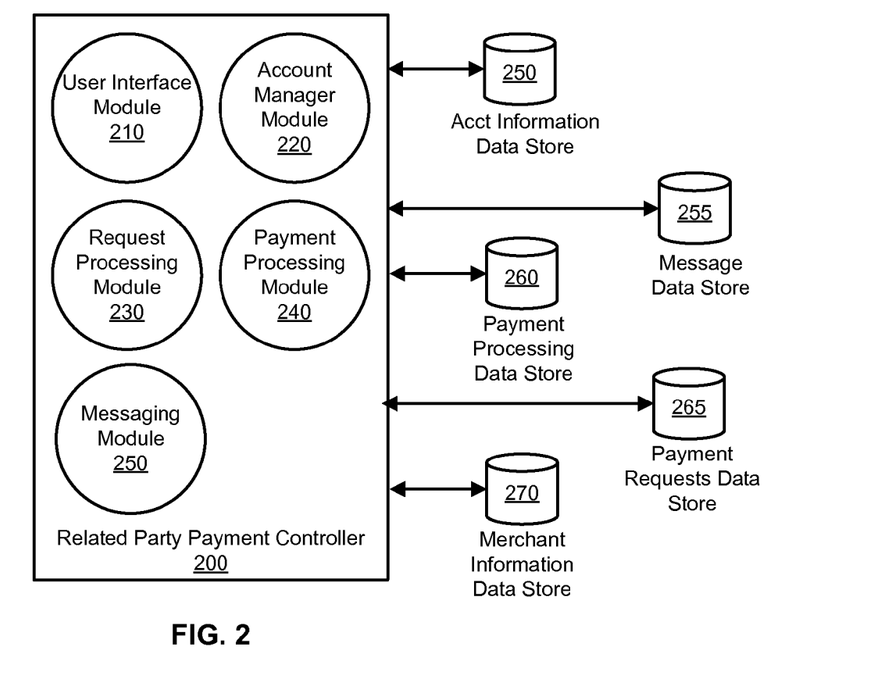
FIG. 2 is a block diagram of a related party payment controller according to an embodiment.

FIG. 2 is a high level block diagram of a related party payment controller 200 that can be implemented on related party payment server 16 according to an embodiment. Related party payment controller 200 includes a user interface module 210, an account manager module 220, a request processing module 230, a payment processing module 240, and a messaging module 250. The related payment party controller 200 is communicatively coupled to one or more persistent data stores for storing and accessing information used by the related party payment controller 200 in processing payment requests and payments. In an embodiment, the data stores may be implemented using a relational database. In the embodiment illustrated in FIG. 2, related party payment controller 200 is communicatively coupled to an account information data store 250, a message data store 255, a payment processing data store 260, a payment requests data store 265, and a merchant information data store 270.

User interface module 210 provides user interfaces, such as a web page or set of web pages, for users to interact with the related party payment system. For example, the user interface module 210 provides an interface for a child to create a payee account that identifies a parent or guardian responsible for supervising the child's payment requests and for approving or denying at least a portion of the payment requests.

The user interface module 210 also provides a third party payment request (e.g. a "Bill My Parents") interface that can be integrated into the shopping cart or payment interfaces of an online shop provided by an electronic retailer. For example, an electronic shop provided by electronic retailer server 14 may include a button or link on a payment interface provided by the shop that allows a user to initiate third party payment processing for a purchase from the online shop. In an example, a child wishing to purchase a video game from an online video game retailer adds the video game to the electronic shopping cart on the online video game retailer's web site, and selects a "Bill a Third Party" as the payment option for the website. The "Bill a Third Party" option then sends a request to the related party payment server 16 to process the request. The user interface module 210 of the related party payment controller 200 of the related party payment server 16 can then respond to the request by providing a user interface for the child to login to an existing payment account or to create a new account on the related party payment system provide by related party payment server 16. Once the child has created a new account or logged into a new account, the child can then send a payment request to one or more payors who may purchase the item for the child.

Account manager module 220 is configured to access account information data store 250 to retrieve information about child, parent, or contributor accounts and to store account information in the account information data store 250. The account manager module 220 is configured to interface with user interface module 220 to provide account information to be displayed on the various user interfaces provided by the related party payment system and to store account related information entered by users of the system. The account manager module is also configured to handle authentication of usernames and passwords of children, parents, and/or contributors who attempt to log into their accounts. If a user provides a valid username and password combination, the account manager module 220 instructs the user interface module 210 to display an account maintenance screen that is appropriate for each type of user. For example, the account maintenance screen associated with a child may only allow the user to view information related to that client, such as pending requests submitted by the client, requests that have already been processed, and messages sent to the child by the parent or guardian or by a contributor, such as a grandparent. If user provides an invalid username and password combination, the user is denied access to the account maintenance screens The account information stored in the account information data store 250 can include different information for the user depending upon the type of account that is associated with the user. For example, a child's account can include information such as a contact email address, the child's name and age, a designated parent and guardian for the child and contact information for that parent or guardian, and contact information, such as email addresses or telephone numbers, for other payors associated with the child. A parent account or a contributor account can have payment source information associated with the account. For example, the parent may associate one or more credit or debit cards with the account or may provide a checking account from which payments may be debited.

Request processing module 230 is configured to access payment requests data store 265 to access third party payment request information stored therein and to update or delete existing third party payment request information or to add new third party payment request information. The request processing module 230 is configured to interface with user interface module 220 to provide payment request related data for populating payment request data in the user interfaces generated by user interface module 220 and for storing in payments request data store 265 payment request data entered into the user interface by the users. The payment request data stored in payment requests data store 265 includes various information related to the payment request, such as the price of the item requested, the name of the item requested, a transaction identifier for the transaction that has been suspended pending the processing of the payment request, and the payor or payors designated in the payment request.

Request processing module 230 also accesses, updates, and deletes information from merchant information data store 270. Merchant information data store 270 is used to store merchant specific information related to a payment request, such a Universal Resource Locator ("URL") linking a description and/or image of an item that the child would like the payor or payors to purchase for the child. The merchant specific information may also include a link to general information about the ecommerce retailer, such as the return policies, shipping costs, and/or other information related to the merchant. In an embodiment, the merchant related information may be displayed in the user interface displayed to a payor when a payor selects a payment request to review. In an example, a child submits a payment request for a video game from a video game merchant.

Payment processing module 240 is configured to process payments for payment requests that have been approved by a payor. Payment processing module 240 accesses payment information from the payment processing data store 260 and adds payment information to the payment processing data store 260. The payment processing data store 260 may include information, such as a payment request identifier for associating the payment back to a particular payment request, a payor name, and a payment source identifier, such as a credit or debit card number, a checking account number for electronic check processing or direct debit, and/or other payment source identifiers. The payment processing data may include the other payment related information such as the date that the payment request was submitted to the payment processing network, the status of the payment (e.g., pending or processed), and/or other payment related information.

In one embodiment, the payment processing module 240 is configured to process payment transactions using third party payment processors, such as payment processing networks for credit card, debit card, check card transactions, or electronic checks. The payment processing module 240 provides the payment related information to the payment processing network and the payment processing network processes the transaction. In some embodiments, the payments are processed and credited to an escrow account associated with the related party payment service. Once the money has been credited to the escrow account, the funds may be paid to the electronic retailer through various methods, such as electronically depositing the funds into a specific account provided by the electronic retailer, and the retailer notified that the payment for the pending transaction has been completed so that the retailer can complete the pending transaction (e.g., pack and ship the goods to the child who made the third party request). In some embodiments, the funds for a retailer may be transferred as soon as the funds are available in the escrow account. According to other embodiments, the funds for a particular retailer may be periodically credited to the retailer In some embodiments, the payment processing module 240 may not process the payment directly, but instead may provide the payment source information, such as the credit card number, debit card number, or other information to the electronic retailer for processing. The electronic retailer may then process the payment using whatever methods the retailer typically uses for payment processing. The merchant information data store 270 may include the information payment account information for the retailer that identifies an account where the money held in escrow by the related party payment system may be transferred.

Messaging module 250 is configured to allow users to send and receive messages regarding payment requests to one another. For example, a child may send a message to a parent or a guardian explaining why they want the parent or guardian to pay for a particular item. The parent may in turn send a message to the child asking for more information or stating why the parent will accept or deny the payment request. Message module 250 is configured to access message data from and to write message data to message data store 255.

Figure 3:
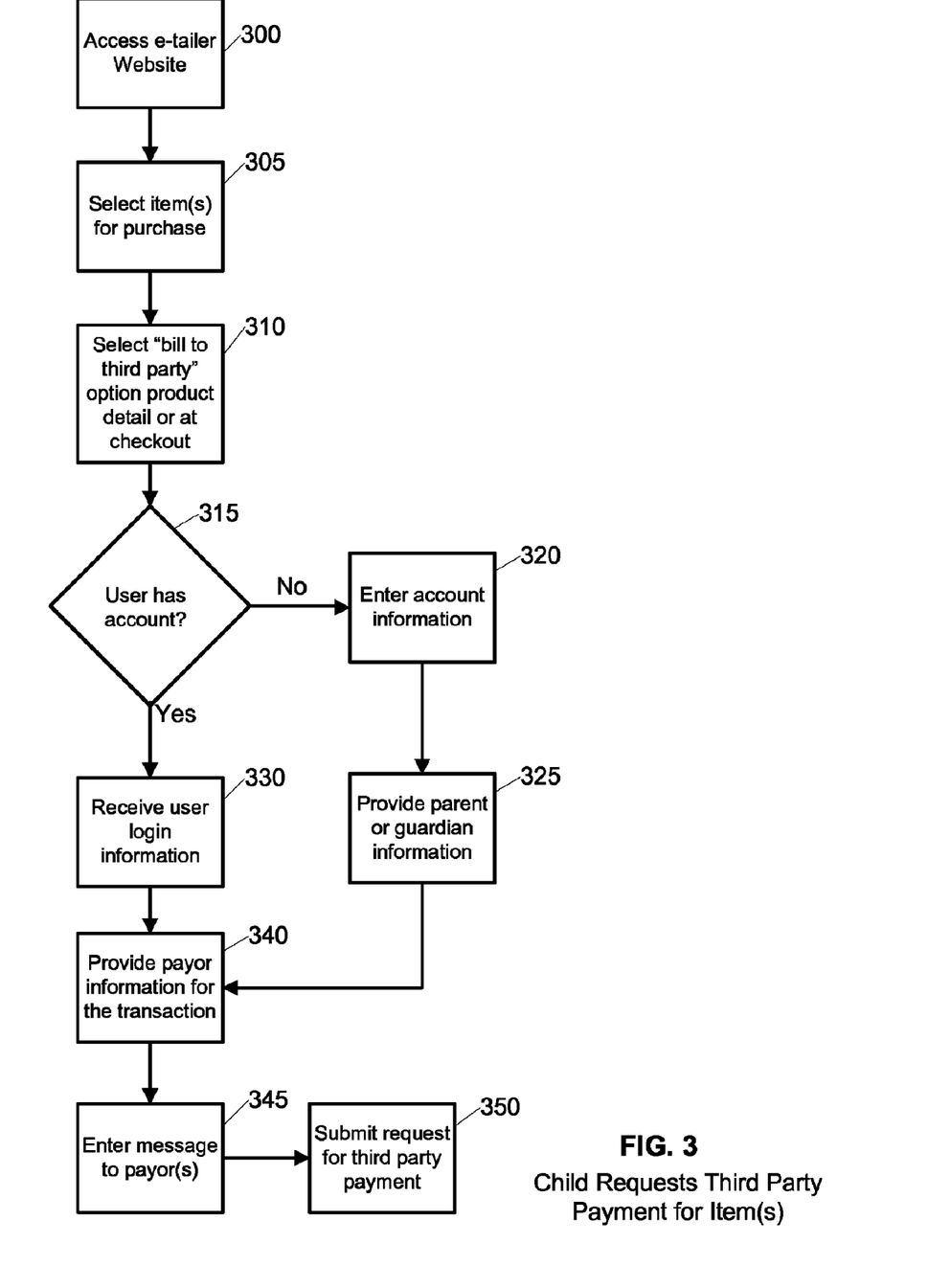
FIG. 3 is a flow diagram of a method for requesting the payment for an item at an online retailer according to an embodiment.

FIG. 3 is a flow diagram of a method for requesting the payment for an item at an online retailer according to an embodiment. A child accesses an online store of an electronic retailer (step 300) and selects one or more items that the child would like to have a parent or other payor purchase or the child (step 305). In one embodiment, at the payment or checkout screens of electronic shop, the child selects a "bill to third party" option on the website (step 310). For example, a website for an electronic retailer may include a number of payment options, such as a payment by credit or debit card, payment by electronic check, or "bill to third party" such as a parent or guardian. If the credit or debit card option or the electronic check options are selected, the electronic retailer can collect the appropriate account information from the child and submits the account information to a payment processing network, bank, or other processor in order to process the payment for the transaction. However, as described above, a child typically will not have access to a credit or debit card or a bank account, and a parent or guardian may not wish to share this account information to prevent the child from making other unauthorized purchases from other electronic retailers without the express permission of the parent. Therefore, web retailers may offer the additional option of billing a third party for the items that the child would like to purchase. In an alternative embodiment, the electronic retailer may integrate a button or other navigational element, such as a link, directly on a product web page within the online shop. Instead of adding the item to the online shop's shopping cart, the child can click the button or activate navigational element to generate a third party payment request without having to add the items to the online shop's shopping cart. In an embodiment, the electronic retailer's product information is captured and is used to create a virtual shopping cart. The virtual shopping card can operate similarly to an electronic shopping card that is integrated into the retailer's online shop, allowing the child to add additional products or services to the virtual shopping card and to purchase the items in the virtual shopping card. The related party payment system is used for funding the purchase of the items in the virtual shopping card through third party payment requests. The related party payment system can also generate reports for the online retailer to identify purchases that are being funded via third party payments that identify the items that were selected and the status of the funding for these items.

If the child has selected the "bill to third party option," the server presents the child with a login screen generated by user interface module 210. The login screen provides inputs for entering the username and password that the child selected when the child created an account with the system previously. In one embodiment, the username of the child may be the child's email address. In an embodiment, the login screen includes a link or a button that enables the child to have his or her password emailed to him or her if the child has forgotten their password. In other embodiments, clicking the "forgot password" link or button causes the related party payment server 16 to email the child's lost password to the parent and the parent can provide the password information to the child.

If the child already has an account with the system, the child can provide his or her login information at the login screen in order to log into the system (step 330). A child must have a login established with the system that includes a designated parent or guardian that is responsible for monitoring the child's payment requests prior to the child being able to use the third party billing option on electronic retailers' websites.

If the child does not already have an account, the child can select a "new account" link or button on the login screen. The child is then presented a series of account creation screens generated by user interface module 210 of the related party payment controller 200 (step 320). The account creation screen gathers basic information from the child, such as the child's name, email address, and a password that the child would like to use to log on to the related party payment system again in the future. The child must then designate contact information for a parent or guardian for the child (step 325).

The parent or guardian is responsible for the child and can view and approve or deny payment requests submitted by the child. The parent or guardian may also be designated either in whole or in part as a payor on the transactions submitted by the child. According to one embodiment, the parent or guardian must approve the creation of the account before the child can begin creating third party payment requests. Upon setting up the account, the parent or guardian is notified that the child has attempted to create a third party payment account and that the parent must visit the website for the related party payment system in order to complete the setup of the account. The parent can then authorize the creation of the child's account and/or create an account for the parent. The parent may be notified via email, a text message on a mobile phone, or via other means depending upon the parent or guardian contact information provided by the child.

Once the child has been logged into the system, a "create third party payment request" interface is generated by the user interface module 210 and displayed to the user. The create third party payment request interface allows the child to select a third party payor or payors to whom a payment request for the item or items will be sent (step 340). The third party payor or payors will be billed for the item or items selected by the user if the third party payor or payors approve the third party payment request. In an example, a child may send a payment request to multiple payors, such as to a parent and a grandparent, in an attempt to get either the parent or the grandparent to pay for the selected item or items. In one embodiment, each of the designated payors may contribute a portion of the total purchase price for the item or items included in the payment request. If the contributions from each of the payors are sufficient to cover the total amount due for the pending transaction, the purchase will be completed and the individual payors billed for the amount authorized by that payor.

The create third party payment request interface can also provide an input field where the child can enter an optional message to be sent to the designated payors (step 345). For example, the child could include a message "Hi Grandma! This is the game I told you about earlier that I would like to have for my birthday. Could you get it for me??? Please!!!"

At step 350, the child submits the request for third party payment to the related party payment system. The related party payment system sends payment authorization requests to each of the payors designated by the child in the payment request and can also notify the parent or guardian that the child has submitted a request for payment. The electronic retailer is also notified that the payment requests have been submitted to the third party payors. The electronic retailer may then suspend the transaction until the notification has been received from the related party payment server 16 that the payment has been received and the transaction can be completed or that the payment requests have been denied and transaction should be canceled.

In an embodiment, a child may reassign a pending third party payment request to a different payor at any time. For example, if the child has sent a request to a parent request that the parent fund the purchase of a particular item for the child, the child may log in to the related party payment system, select the pending payment request from the list of pending payment requests associated with the child, and reassign the pending payment request to another contributor. For example, the child may reassign a pending payment request from a parent to a grandparent. In one embodiment, a child may also add an additional payor, such as a parent or other contributor, to a pending payment request or remove a designated payor from the pending payment request.

Figure 4:
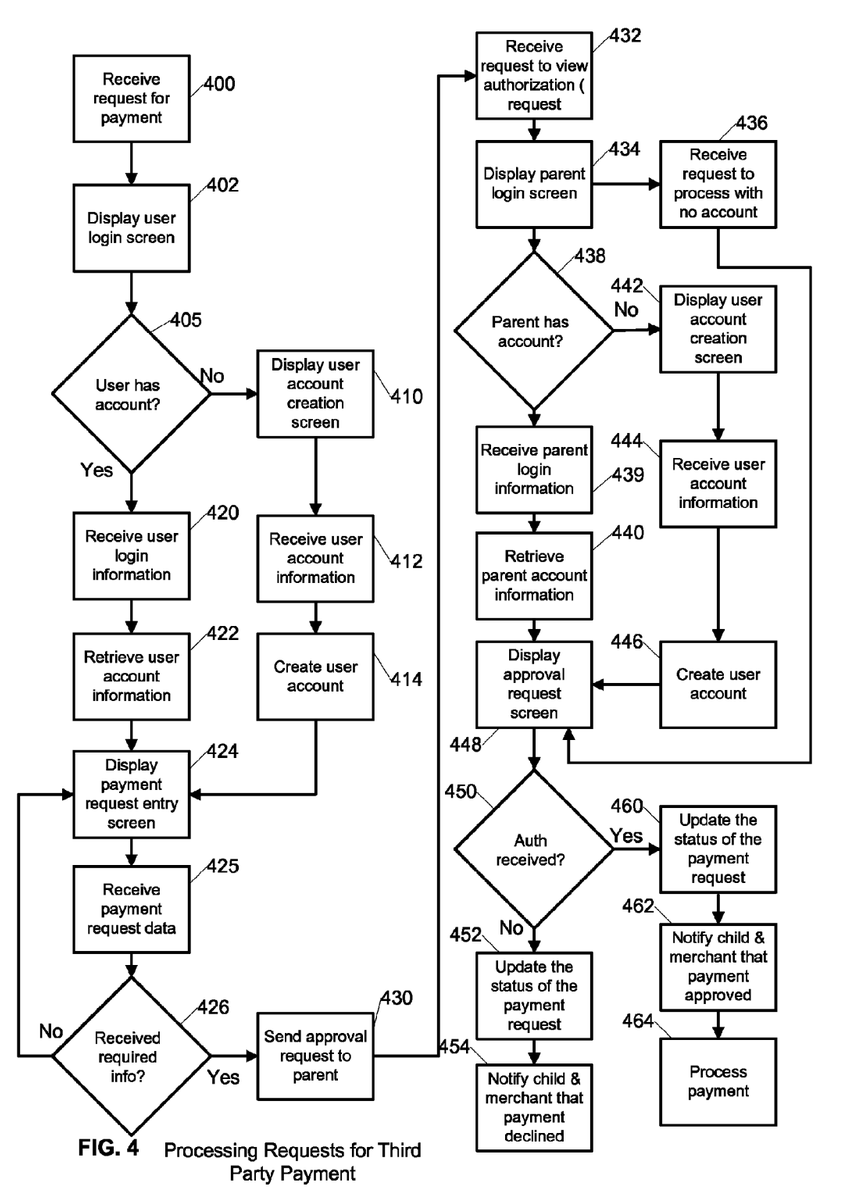
FIG. 4 is a flow diagram of a method for receiving and processing requests for related party payment requests according to an embodiment.

FIG. 4 is a flow diagram of a method for receiving and processing requests for related party payment requests according to an embodiment. The method illustrated in FIG. 4 can be used to implement the various functionality of the related party payment server illustrated in FIGS. 1 and 2. The related party payment server 16 receives a third party payment request submitted by a child (step 400). The child submitting such as request is described in step 350 of the method illustrated in FIG. 3. The third party payment request may be received from an electronic retailer server 14 hosting an online shop that allows third party payments. The electronic retailer's online shop sends a request to for a third party payment to the related party payment server 16. The functionality to send the request for the third party payment may be integrated into a shopping cart feature of the online shop or may be accessed via a standalone a navigational element that allows the child to select an item by clicking on or otherwise activating the navigational element.

The third party payment request includes various information that identifies the item or item(s) to be purchased from the online shop as well as the payors who the child has designated to receive the third party payment request. For example, the third party payment request may include a item name, item description, a URL or other type of direct link to each of the requested items in the online shop, a unique identifier for each item used by the retailer to identify the item, such as a Universal Product Code ("UPC") typically encoded on a barcode found on many products sold throughout North America, an International Standard Book Number ("ISBN") used to identify books, or another standard's based or merchant assigned item number.

Upon receiving the third party payment request, a login screen is displayed to the child (step 402) requesting that the child login or create a new user account. The user interface module 210 may provide a web page login interface that includes inputs for entering a username and password, and a button or other navigational element that, when activated, causes the related party payment controller 200 to display an account creation interface to the child. If the child does not have an account (step 405) and elects to create a new account, a new account creation screen or set of screens is displayed to the user (step 410). In an embodiment, the user interface module 210 provides a "create new account" form as a web page for display in the browser software installed child's user device 12 or 18. The child enters various account information into the form, such as the child's name, email address, and the name and contact information for a parent or guardian. This account related information is received by the related party payment server 16 when the child submits the form (step 412), and a new user account is created for the child (step 414). In an embodiment, the user interface module 210 receives the account information data submitted by the user and passes the data to the account manager module 220, which creates a new account for the user and stores the account information in the account information data store 250.

If the child has a user account, the child enters his or her username and password into the login interface and submits the login information to the server in order to gain access to the system. The server receives the login information submitted by the child (step 420), and retrieves the account information for the child. In an embodiment, the user interface module 210 receives the username and password data submitted by the user and passes the data to the account manager module for verification. If the child has an existing account, the account information for the child's account is retrieved from the account information data store 250 by the account manager module 250.

Once the child has logged in and/or created a user account, a "create third party payment request" data entry screen is displayed to the child (step 424). In an embodiment, the third party payment request entry screen is a web page that is provided by the user interface module 210 for display in the browser software installed on the child's user device 12. The third party payment request screen includes inputs that allow the user to designate one or more third party payors related to the child that may pay for the item or items. For example, the child may send a payment request to both a parent and grandparent for the same item, and either the parent or the grandparent may pay for the item or each may contribute a portion of the cost of the item. The user submits the "create third party payment request" form and the related party payment server 16 receives the third party payment request data (step 425). The user may also optionally include a message to be displayed to the payors. The data received by the related party payment server 16 is stored in the payment processing data store 260 by the request processing module 230.

A determination is made whether the minimum required data needed to process a third party payment request has been received (step 426). In an embodiment, a child needs to designate only a payor and the request processing module 230 generates a payment authorization request for the item and sends the payment authorization request to the payor via email, text message, or other methods included in the payor contact information stored in the account information data store 250. If the child has not designated a payor or has not provided other required information the "create third party payment request" screen is displayed again with the information entered by the user pre-populated in the form and with any required fields for which data was not provided highlighted.

A payment authorization request is sent to the child's designated parent or guardian (step 430). In the embodiment illustrated in FIG. 4, the approval request is merely sent to a single payor, the parent. However, the method steps described herein similarly apply to embodiments where a non-parent or non-guardian contributor is designated as a payor or where multiple payors are designated in a third party payment request. In an embodiment, when multiple payors are designated in a third party payment request, a separate payment authorization request is generated for and sent to each of the designated payors.

The payment authorization request may comprise an email or other type of message indicating that the child has requested that the parent buy a particular item (step 430). In one embodiment, the payment authorization request includes a link the item at the online shop, the total amount requested, a description of the item, and any optional message that may have been included in the third party payment request data submitted by the child. In one embodiment, a parent may receive a notification, such as an email or a text message that a new payment authorization request has been received and that the parent should log in to view the request. In this embodiment, the parent accesses a URL that links to a user interface that allows the parent to view pending payment authorization requests and to authorize or deny these requests (step 432). In an embodiment, the URL may be embedded in the payment authorization request message that was sent to the parent and the parent may click on or otherwise activate this link to view the request.

Once the parent's request to view the payment authorization request has been received, a login screen is displayed to the parent to allow the parent to enter his or her username and password and to submit the login credentials to the related party payment server 16. Alternatively, the parent can opt to process the payment authorization request without logging into the system (step 436). The login screen may include a link or other navigational element that allows a parent to proceed without logging in to the system.

If the parent has a user account and wishes to login, the parent enters his or her username and password into the login interface and submits the login information to the server in order to gain access to the system. The server receives the login information submitted by the parent (step 439), and retrieves the account information for the parent (step 440). In an embodiment, the user interface module 210 receives the username and password data submitted by the parent and passes the data to the account manager module for verification. If the parent has an existing account, the account information for the parent's account is retrieved from the account information data store 250 by the account manager module 250.

If the parent does not have an account and elects to create a new account, a new account creation screen or set of screens is displayed to the parent (step 442). In an embodiment, the user interface module 210 provides a "create new account" form as a web page for display in the browser software installed parent's user device 12 or 18. The parent enters account information into the form, such as the parent's name and contact information. The parent may also provide payment source information such as a credit card or a debit card number or a bank account number. This account related information is received by the related party payment server 16 when the parent submits the form (step 444), and a new user account is created for the parent (step 446). In an embodiment, the user interface module 210 receives the account information data submitted by the parent and passes the data to the account manager module 220, which creates a new account for the parent and stores the account information in the account information data store 250.

After the parent has logged in, created an account, or opted out of creating or an account or logging in, a payment authorization request screen is displayed to the parent (step 448). In an embodiment, the payment authorization request screen is a web page displaying details about the pending payment request is displayed, such as the item that the child would like the payor or payors to purchase, the merchant from which the item was ordered, the cost of the item, the date that the payment request was submitted to the payors, and the payors to whom the request was submitted. The payment request information may also include the whether any of the payors have approved a payment request for a portion of the amount due for the item, and what the remaining unapproved amount that is still needed in order to purchase the item from the electronic retailer. The parent has the option to approve the payment authorization request, decline the request, or to take no immediate action on the request, which leaves the request pending.

If the parent declines the payment authorization request, the request processing module 230 updates the status of the request in the payment request data store 265 to indicate that the third party payment request has been declined (step 452). A message is also sent to the child and to the merchant indicating that the payment request has been denied (step 454). In embodiments where the "Bill to Third Party" functionality is integrated into the shopping cart of an online shop, the merchant may then cancel a suspended transaction since the payment authorization was declined. In embodiments where multiple payors have been designated on a third party payment request, if one payor declines, the other payors and the child are notified that the payor declined and the remaining payors may still individually decline or authorize the transaction. The third party payment request remains pending until all of the payors decline or authorize the transaction, and the merchant is not notified until all of designated payors have declined or authorized the transaction. In an embodiment, if one payor authorizes a payment of the full outstanding amount on a pending transaction, the system may mark the other payors who have not yet responded as "declined" so that the transaction may be processed and no outstanding payment authorization requests remain pending.

Figure 5:
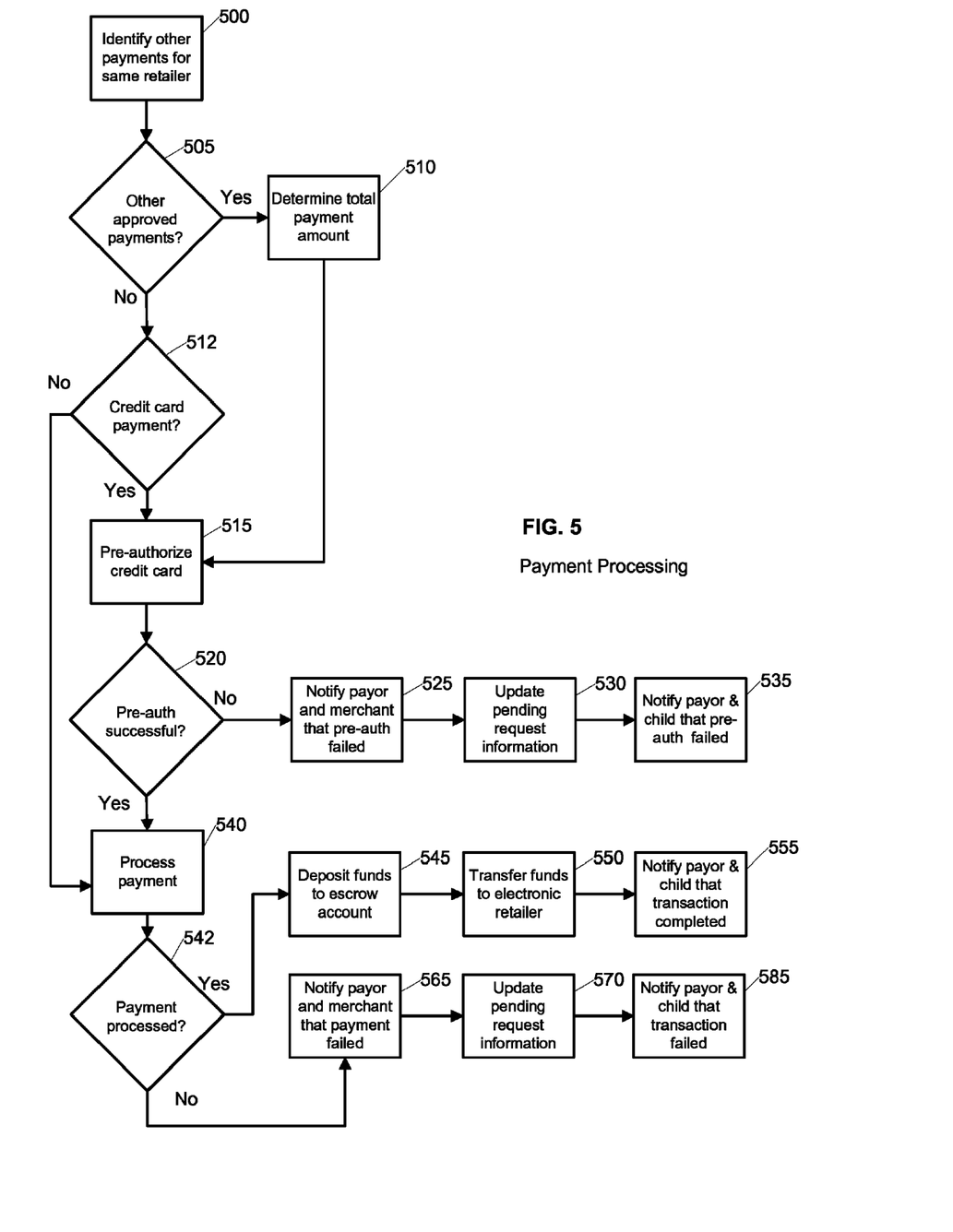
FIG. 5 is a flow diagram a method for processing payments in response to an approval of a related party payment request according to an embodiment.

If the parent authorizes the payment authorization request, the request processing module 230 updates the status of the request in the payment request data store 265 to indicate that the third party payment request has been authorized (step 460). A message is also sent to the child and to the merchant indicating that the payment request has been authorized (step 460), and payment processing is performed to bill the parent for the authorized amount. FIG. 5 illustrates one method of payment processing the may be used according an embodiment.

According to an embodiment, the parent may also chose a shipping address for the items being funded so that the items are shipped to the parent rather than directly to the child. This allows the parent to more closely monitor the items that the child is ordering. For example, a parent may wish to have a DVD or book that the child has requested sent to the parent so that the parent can determine whether the content is appropriate for the child before the item is given to the child.

In the event that a parent has not logged into the system or has not provided payment source information, the related party payment server 16 displays a screen requesting that the payor provide payment source information, such as a bank account number, credit card number, or debit card number. The payment source information entered by the parent can then be used to process the payments (step 464).

In some embodiments, when a child designates multiple payors and one payor authorizes payment authorization request for less than the full amount required to pay the items in full, the payment request data store 265 is updated to indicate that the payment amount third party payment request has been paid in part. The child is notified that part of the requested payment amount has been paid by one of the payors designated associated with the third party payment request. In one embodiment, the other designated payors associated with the third party payment request may also be send a message notifying that one of the designated payors has made a partial payment.

In an embodiment, the online retailer is provided a report that provides specific details of all third party payment requests that have been made from the retailer's online shop and whether any payments were made to fund the purchase of these items. The reports identify each item that was requested, the date that the item was requested, the status of the request (e.g., pending, paid, etc.) and the amount paid if a third party payment has been made to fund the purchase of the requested item. In an embodiment, a report may be generated and transmitted to the payor periodically by the related party payment processing system. In some embodiment, the merchant may be provided with a user interface, such as a web page, via user interface module 210 that enables the online retailer to log into the system and view third party request data and payments data related to the retailer's online shop.

FIG. 5 is a flow diagram a method for processing payments in response to an approval of a related party payment request according to an embodiment. The method illustrated in FIG. 5 may be used to implement the process payments step 464 of the method for processing third party payment requests illustrated in FIG. 4. In one embodiment, the related party payment processing system may check for other pending payments to an electronic merchant from the same payor (step 500). For example, a child may have sent payment requests for two or more payment requests for items on the same electronic retailer's online shop to the same payor. Rather than process the payments separately for these transactions, it may be more cost effective to process a single electronic payment for the total amount of all of the transactions. If multiple pending and approved transactions exist for the payor and the electronic retailer (step 505), the total amount payment amount due for all of the identified transactions is determined (step 510).

A determination is made whether the payor has designated a credit card as the funding source for the payment (step 512). If a credit card has been designated as the funding source, the credit card can be preauthorized (step 515) for the amount of the payment to determine whether the charge to the card would be declined or authorized by the payment processing network or the bank that issued the credit card. Preauthorization of the credit card can save the electronic retailer from incurring payment processing charges for the credit card if the charge is declined. A determination is made whether the preauthorization of the credit card was successful (step 520). If the preauthorization is declined, the payor and the merchant can be notified that the preauthorization has failed (step 525), and the pending request for payment may be updated to indicate that the credit card transaction was declined (step 530). A notification message may also be send to the child and the payor indicating that the transaction has failed (step 535). In some embodiments, the merchant may not be notified at step 525 that the preauthorization failed, and the payor may be sent a message by the system at step 535 providing the payor with the opportunity to select an alternative funding source for the transaction and to process the payment using the alternative funding source. In some embodiments, the child may be sent a message at step 525 that enables the child to select an alternative payor and to generate a payment request to the alternative payor.

The payment is processed (step 540) via payment processing network, bank, or other electronic payment system, depending upon the source of funding that was selected by the payor. A determination is made whether the payment process successfully (step 542). The payment processing network may decline a transaction due to insufficient funds or for various other reasons. If the payment is declined, the payor and the merchant can be notified that the payment has been declined (step 565), and the pending request for payment may be updated to indicate that the payment transaction was declined and that the request is pending (step 570). A notification message is then send to the child and the payor indicating that the payment transaction has failed (step 535). The merchant may optionally cancel the pending transaction at due to the declined payment transaction. In some embodiments, the merchant may not be notified at step 565 that the payment was declined, and the payor may be provided the opportunity to select an alternative funding source and to process the payment using the alternative funding source. In some embodiments, the child may be sent a message at step 565 that enables the child to select an alternative payor and to generate a payment request to the alternative payor.

In an embodiment, if the payment processes successfully the funds from the payment are credited to an escrow account maintained by the related party payment system (step 545).

The related party payment system then transfers the funds from the escrow account to electronic retailer's account (step 550). The transfer may occur as soon as funds are available in the escrow account. In an embodiment, the funds may be held in the electronic escrow account until a threshold balance is reached in order reduce transactional costs incurred by transferring money from the escrow account to the electronic retailer's account. In another embodiment, scheduled transfers may be made from the escrow account to the electronic retailer's account (e.g., weekly or monthly transfers). A message indicating that the transaction has completed can then be generated and sent to the payor and the child and the status of the pending transaction request may be changed to a "paid" status in the related party payment system (step 555).

Figure 6:
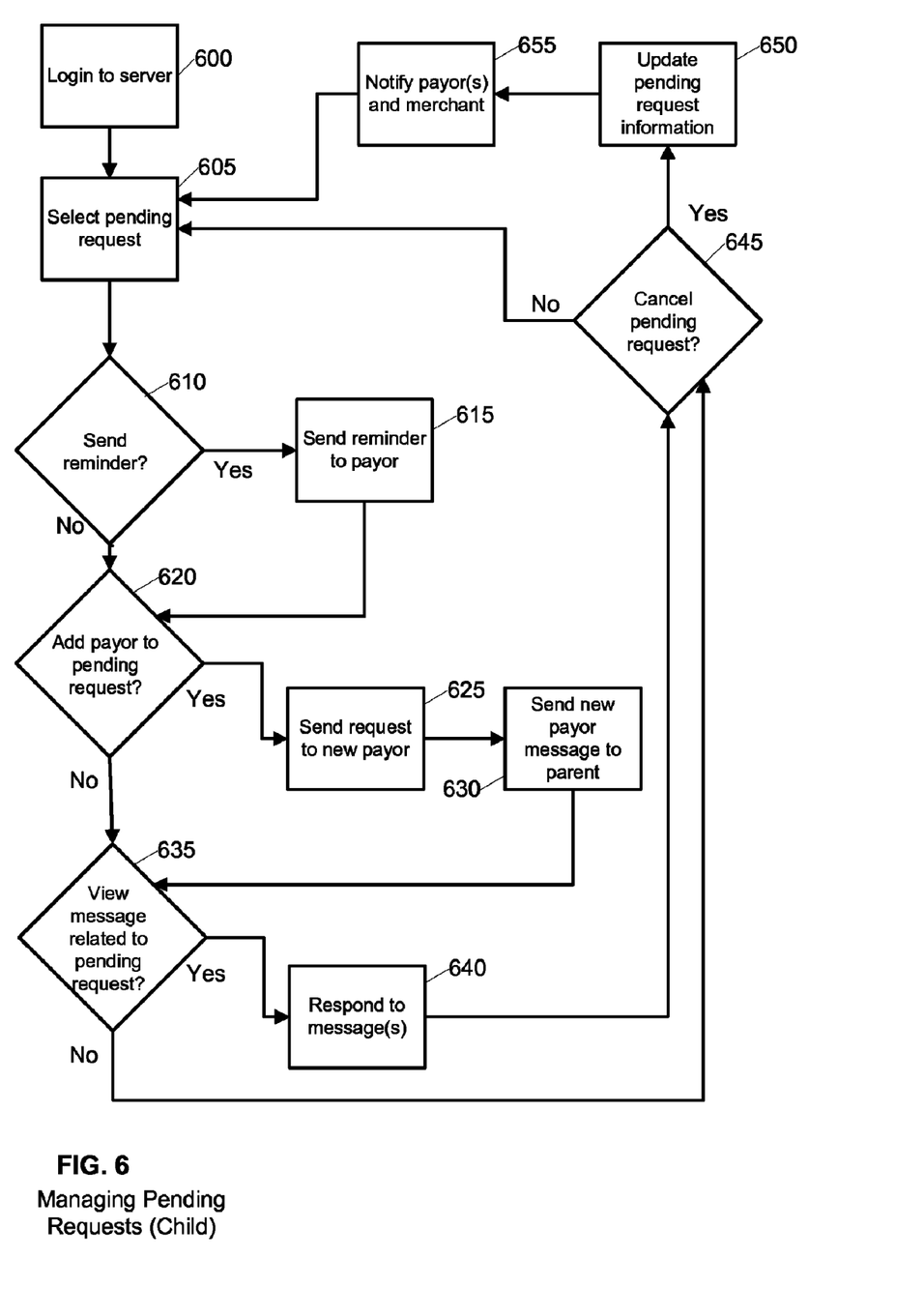
FIG. 6 is a flow diagram of a method for a child to manage pending payment requests according to an embodiment.

FIG. 6 is a flow diagram of a method for a child to manage pending payment requests according to an embodiment. A child may view, modify, or delete pending payment requests. The child must first login to the server by entering a URL of a login page into a web browser located on a user computer 12 or 18 (step 600). The user interface module 210 of the related party payment controller 200 generates a login screen user interface web page to be displayed to the child. After logging into the system, the child is presented with a web page or series of web pages that enable the child maintain the child's account and view and/or modify pending requests. The web pages can include both pending and processed payment requests.

The child can select a pending payment authorization request (step 605) to view and/or modify from a listing of pending payment authorization requests. A web page displaying details about the pending payment request is displayed, such as the item that was ordered, the merchant from which the item was ordered, the cost of the item, the date that the payment request was submitted to the payors, and the payors to whom the request was submitted. The payment request information may also include the whether any of the payors have approved a payment request for a portion of the amount due for the item, and what the remaining unapproved amount that is still needed in order to purchase the item from the electronic retailer.

The child may decide to send a reminder to a payor who has not yet responded to a payment authorization message sent to the user in response to a third party payment request initiated by the child (step 610). A reminder message is generated and sent to the designed payor reminding the payor that the payment authorization for the payment (step 612). The message may be sent using email, a text message to a mobile phone, or via other means specified in the payor contact information for that payor. In an embodiment, the child may also select the type of reminder message to be sent (e.g., text message or email) and may also provide a short message to be included with the reminder.

A child may also decide to add a new payor to a pending third party payment request (step 620). For example, the child may have originally designated a grandparent as the payor for a payment request, but may later decide to add a parent as a payor on the payment request. The pending payment request information user interface can provide a button or other control, such as a hyperlink, that the child can activate to indicate that the child would like to add an additional payor to a pending third party payment request. The user interface module 210 causes an "Add Payor" user interface web page to be displayed to the user in response to the request to add an additional payor to the pending request. The child selects a new payor to associate with the request, enters an optional message to the new payor, and submits the request to add the new payor. In response to the request, the system generates a payment authorization message to the new payor (step 625).

In an embodiment, the parent or guardian of the child is also sent a message indicating that the child has added a new payor to a pending payment request (step 630). In an embodiment, the parent may optionally block the addition of the new payor to the pending payment request.

The child may also decide to view messages associated with the pending request (step 635). In an embodiment, the child may click on a "read message" button or hyperlink that causes the user interface module 210 to generate a message interface that enables the user to read and respond to messages. A payor or the parent or guardian may send messages to the child about a pending request. For example, a parent might send a question to the child, "I thought we just bought you a new set of shoes for basketball last month when school started. What happened to those shoes?" The child may then optionally send a message in response to these messages (step 640). For example, the child might respond, "But I need a new set of cleats for football as well!"

The child may also decide to cancel a pending request for third party payment (step 645). If the child decides to cancel a pending request for a third party payment, the pending request information stored in the payments request data store 265 is updated to indicate that the payment request has been canceled (step 650). The payor(s) and the merchant associated with the pending request are also notified that the child has canceled the pending request (step 655). In response, the merchant can cancel the transaction that was suspended at the merchant's online shop pending the authorization of the payment request or payment requests associated with the transaction.

Figure 7:
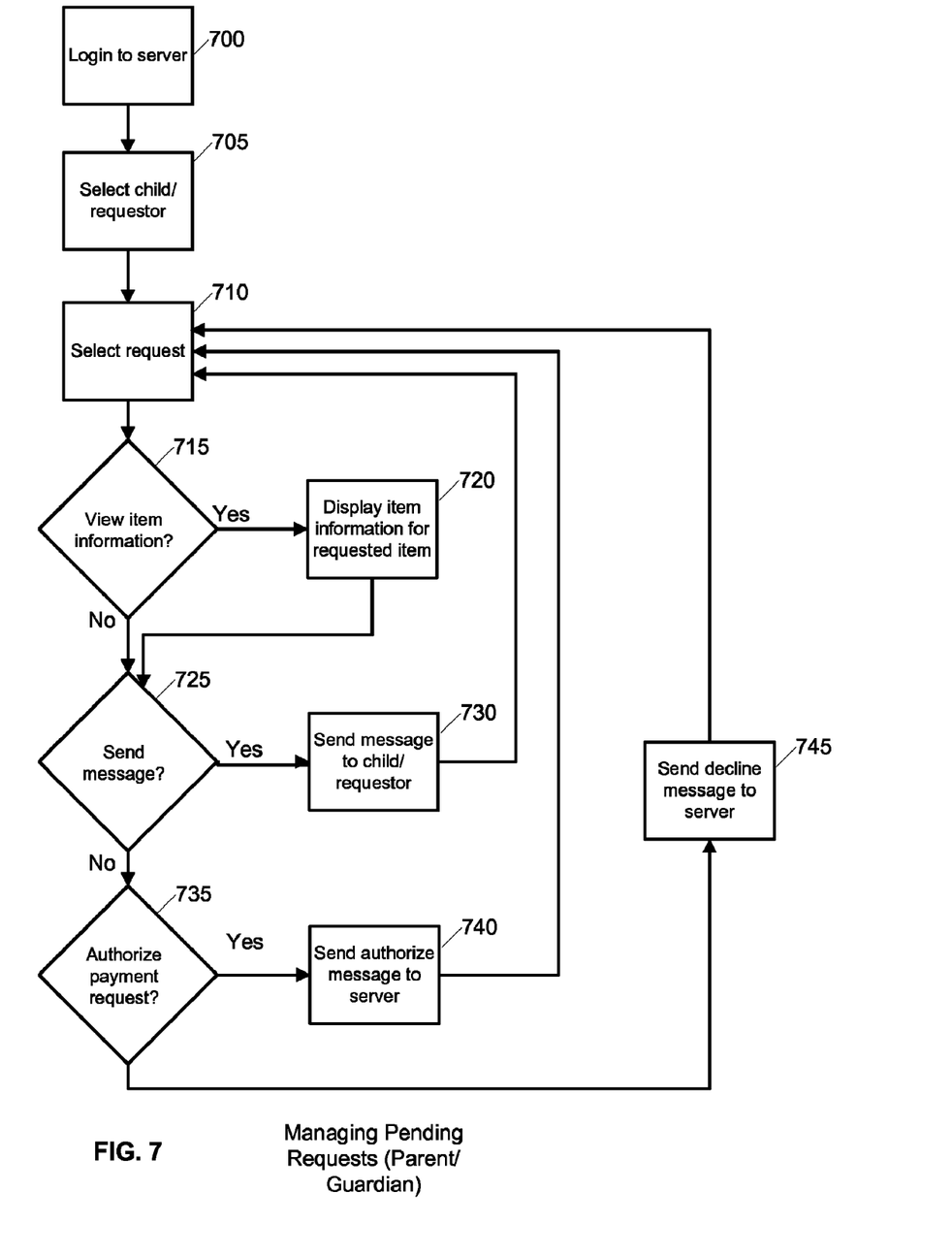
FIG. 7 is a flow diagram of a method for a parent or guardian to manage pending payment requests from one or more children according to an embodiment.

FIG. 7 is a flow diagram of a method for a payor to manage pending payment requests from one or more children according to an embodiment. The payor may be a parent or guardian of the child making the request or the payor may be another related third party payor designated on a third party payment request issued by the child.

The payor can first log into the server by entering a URL of a login page into a web browser installed on the payor's computer system (e.g., user device 12 or 18) (step 700). The user interface module 210 of the related party payment controller 200 generates a login screen user interface web page to be displayed to the payor. After logging into the system, the payor is presented with a web page or series of web pages that enable the payor to view and/or authorize pending requests. The web pages can include both pending and processed payment requests on which the payor was designated.

A payor may have pending payment authorization requests associated with multiple children. For example, a grandparent with multiple grandchildren may have pending payment authorization requests associated with more than one of their grandchildren. The payor may select a child for which the payor would like to view pending requests (step 705), and a list of pending payment authorization request associated with the selected child is displayed to the payor.

The payor may then select a particular pending payment authorization request for processing (step 710) to view and/or authorize. A web page displaying details about the pending payment request is displayed, such as the item that was ordered, the merchant from which the item was ordered, the cost of the item, the date that the payment request was submitted to the payors, and the payors to whom the request was submitted. The payment request information may also include whether any of the payors has approved a payment request for a portion of the amount due for the item, and what the remaining unapproved amount that is still needed in order to purchase the item from the electronic retailer.

The payor may then choose to view the item at the merchant's website (step 715). The user interface that displays the pending payment request may include a link or other navigational element to each of the requested items on the online merchant's website. Activating the link or the other navigational element can direct the browser installed on the user's computer system to access the page of the online shop for an item that the child would like the payor to purchase for the child.

The payor may also choose to send a message to child about the pending payment authorization request (step 730). In an embodiment, the message is viewable by the child by logging into the related party payment system. In some embodiments, the message may also be sent to the child via email or text message. In an example, a payor may send a message requesting more about the product or why the child would like the payor to purchase the product.

The payor may also decide whether to authorize or decline the payment request (step 735). If the payor decides to decline the payment authorization request, a decline payment message is sent to the server and the server processes the declined payment request according to steps 452 and 454 of the method illustrated in FIG. 1. If the payor authorizes the payment, then an authorize payment message is sent to the related party payment server 16 and the server processes the authorization according to steps 460, 462, and 464 of the method illustrated in FIG. 1.

Figure 8:
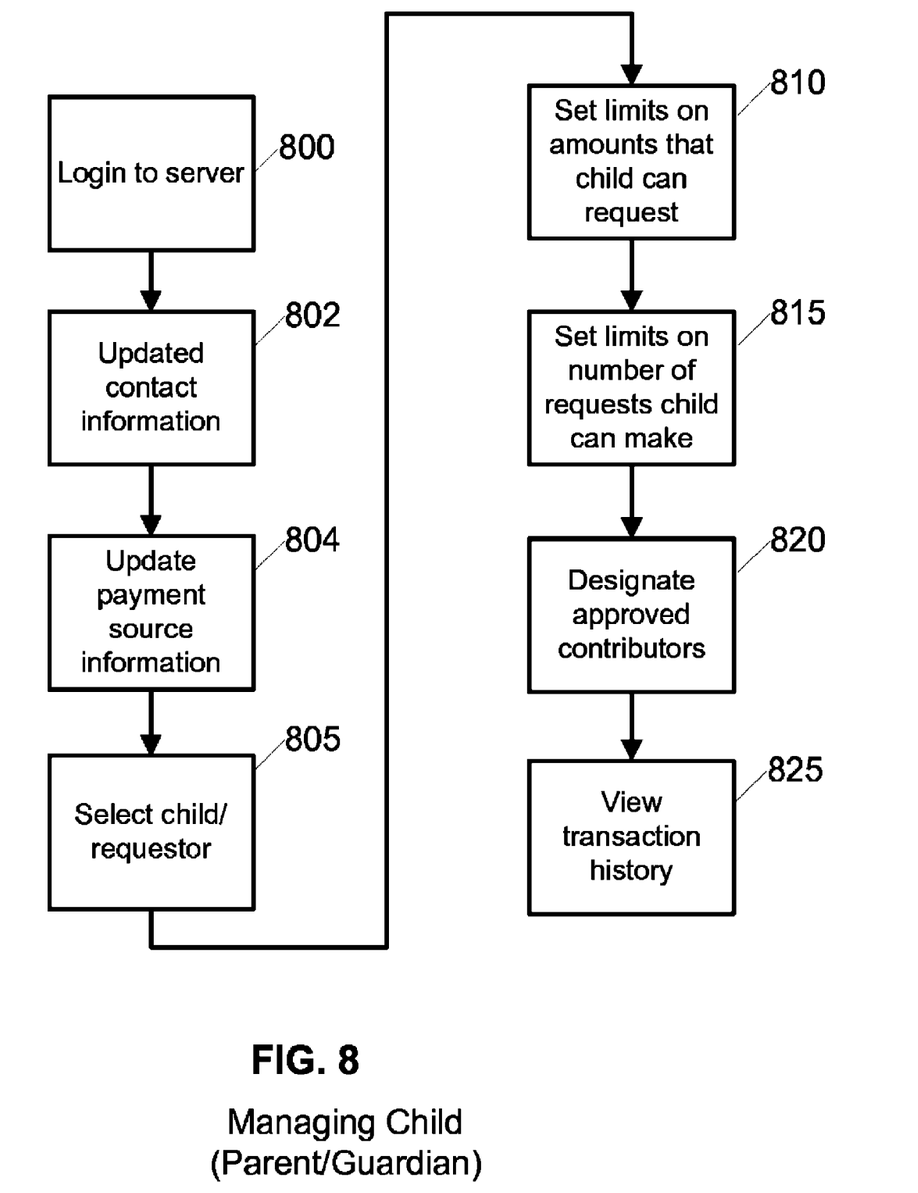
FIG. 8 is a flow diagram of a method for managing a child's account according to an embodiment.

FIG. 8 is a flow diagram of a method for managing a child's account according to an embodiment. A parent or guardian may manage account parameters of one or more children associated with the parent or guardian. For example, the parent or guardian can set limits on the number of payment requests that a child may make during a predetermined period of time (e.g., over a period of a week, month, or year), the monetary amount associated that a child may request on a "per request" and/or over a specified period of time.

In order to manage the children's account parameters and/or the parent's account information, the parent must first log on to the related party payor system in order to access the parent's account (step 800). Once the parent has logged onto the system, the parent may then update the parent's contact information (step 802). For example, the parent may update a contact email address or mobile phone number at which the parent may be notified if a new payment request and/or message is received from a child. The parent may also update the payment source information that the system may use when processing a payment for a payment request that has been authorized by the parent (step 804). For example, the parent may add a new credit or debit card account that may be used as a payment source when processing payments.

The parent may also select a child (a requestor) from the list of children associated with the parent or guardian (step 805) whose account settings are to be modified. In some embodiments, a parent may only have a single child associated with the parent's account, while in other embodiments a parent may have multiple children associated with the parent or guardian. According to one embodiment, the user interface module 210 may provide a user interface that includes a list of children associated with the parent's account and the parent may select a child from the list. According to another embodiment, the user interface module 210 may provide a tabbed user interface where information related to each child associated with a parent account is displayed on a separate tab that is selectable by the parent.

After selecting a child whose account settings are to be modified, the parent may set limits on the monetary amounts that a child can request (step 810). In one embodiment, the user interface module 210 generates a child account maintenance user interface that allows the parent to enter a maximum monetary amount per request that the child may request (e.g., each payment request may be for no more than $50). The parent can also set limits on the maximum amount of money that child can request overall within a predefined period of time (e.g., the child cannot request more than $200 during a month and no more than $1000 during a year).

The parent may also set limits on the number of request that a child may make within a predefined period of time (e.g., no more than two requests per week and no more than four requests per month) (step 815). The parent may also set limits on the number of payment requests that a child may sent to some or all of the payors. For example, the parent may limit the number of payment requests that may be sent to the child's grandparents to one per month, while limiting the number of requests that the child may send to the parent or guardian to five per month.

The parent may also designate approved contributors or third party payors to which the child may send payment requests (step 820). In an embodiment, the parents or guardian may designate a group of approved people or contributors to whom the child may send requests for payment.

The parent may also view the transaction history for the child (step 825). The transaction history for the child can include all of the third party payment requests submitted by the child over a predetermined period of time. The status of each of the payment requests can also be displayed so that the parent can see which payment requests have been denied, which payment requests have been approved, and which third party payments requests are still pending.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular system and design constraints imposed on the overall system. Skilled persons can implement the described functionality in varying ways for each particular system, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), a text messaging system specific integrated circuit (ASIC), a field programmable gate array (FPGA) or other programmable hardware device, discrete gate or transistor logic, discrete hardware components, or any combination thereof designed to perform the functions described herein. A general-purpose processor can be a microprocessor, but in the alternative, the processor can be any hardware other processor, controller, or microcontroller. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in computer/processor readable or accessible storage such as RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art.

We claim:

1. A computer-implemented method for processing payment requests from a first person to a second person and a third person, the payment request requesting that the second person or the third person pay for an item being offered for sale by an online retailer for the first person, where one or more processors are programmed to perform steps comprising:

receiving an electronic third party payment request at the one or more processors from the first person to request that one or more of a plurality of third persons fund the purchase of an item from an online retailer for the first person, wherein the second person can be one of the plurality of third persons;

sending an electronic payment authorization request to each of the plurality of third persons from the one or more processors;

receiving a first authorization to pay a first portion of the purchase from a first of the plurality of third persons;

holding the first authorization in a pending status until a second authorization to pay a remaining balance of the purchase is received from a second of the plurality of third persons; and processing the first authorization and the second authorization at the one or more processors to purchase the item from the online retailer by charging the first of the plurality of third persons and charging the second of the plurality of third persons.

2. The method of claim 1 further comprising processing a payment for an amount identified in the third party payment request using a funding source provided by the first of the plurality of third persons;

receiving the funds in an escrow account; and transferring the funds from the escrow account to an account associated with the online retailer; and notifying the online retailer to process a suspended transaction associated with the third party payment request.

3. The method of claim 1, further comprising declining the third party payment request to purchase the item if the payment authorization response indicates that the first of the plurality of third persons has declined to pay for the item.

4. The method of claim 3, further comprising notifying the online retailer to cancel a suspended transaction associated with the third party payment request.

5. The method of claim 1 wherein the third party payment request includes a message from the first person to the plurality of third persons.

6. The method of claim 1 wherein the third party payment request is received from the online retailer, and wherein the online retailer is configured to suspend a transaction for purchasing the item until a response to the third party payment request is received.

7. The method of claim 1 wherein the retailer is a service provider and the item is a service.

8. A computer-implemented method for processing payment requests from a first person to a second person and a third person, the payment request requesting that the second person or the third person pay for an item being offered for sale by an online retailer for the first person, where one or more processors are programmed to perform steps comprising:

receiving an electronic third party payment request at the one or more processors from the first person to request that one or more of a plurality of third persons fund the purchase of an item from an online retailer for the first person, wherein the second person can be one of the plurality of third persons;

sending an electronic payment authorization request to each of the plurality of third persons from the one or more processors;

receiving a first authorization to pay a first portion of the purchase from a first of the plurality of third persons; and holding the first authorization in a pending status until an authorization to pay a remaining balance of the purchase is received.

9. The method of claim 8 further comprising processing a payment for an amount identified in the third party payment request using a funding source provided by the first of the plurality of third persons;

receiving the funds in an escrow account; and transferring the funds from the escrow account to an account associated with the online retailer; and notifying the online retailer to process a suspended transaction associated with the third party payment request.

10. The method of claim 8, further comprising:

declining the third party payment request from the first person if the payment authorization response indicates that the first of the plurality of third persons has declined to pay for the item.

11. The method of claim 10, further comprising:

notifying the online retailer to cancel a suspended transaction associated with the third party payment request.

12. The method of claim 8 wherein the retailer is a service provider and the item is a service.

13. The method of claim 8 wherein the third party payment request is received from the online retailer, and wherein the online retailer is configured to suspend a transaction for purchasing the item until a response to the third party payment request is received.

14. A system for processing payment requests from a first person to a second person requesting that the second person pay for an item being offered for sale by an online retailer for the first person, the second person having the authority to make purchasing decisions for the first person, the system comprising:
- a computer readable storage device for storing computer executable programmed modules;
- a processor communicatively coupled with a computer readable storage device for executing programmed modules stored therein;
- a request processing module configured to
  - receive an electronic third party payment request from the first person to request that one or more of a plurality of third persons fund the purchase of an item from an online retailer for the first person, wherein the second person can be one of the plurality of third persons,
  - send an electronic payment authorization request to each of the plurality of third persons,
  - receive a first authorization to pay a first portion of the purchase from a first of the plurality of third persons, and
  - hold the first authorization in a pending status until an authorization to pay a remaining balance of the purchase is received; and
- a payment processing module configured to
  - process received authorizations to pay for the purchase.

15. The system of claim 14 wherein the payment processing module is further configured to
- process a payment for the first portion of the purchase authorized by the first of the plurality of third persons using a funding source provided by the first of the plurality of third persons;
- receive the funds in an escrow account; and
- transfer the funds from the escrow account to an account associated with the online retailer; and
- notify the online retailer to process a suspended transaction associated with the third party payment request.

16. The system of claim 14, further comprising
an account manager module configured to
- create a user account for the first person, the account having associated therewith a set of permissions that impose limits on the number of third party requests over a specified period of time and an upper limit on an amount of each third party request that the first person may make, and
- create a supervisor account for the second person, the supervisor account having the ability to set the permissions associated with the first person's user account.

17. The system of claim 16, wherein the supervisor account can also limit which people to whom the first person may send third party payment requests.

* * * * *